United States Patent [19]

Malcolm

[11] Patent Number: 4,740,093
[45] Date of Patent: Apr. 26, 1988

[54] PROPORTIONAL SPACING PRINTING MANAGEMENT

[75] Inventor: Jerry W. Malcolm, Austin, Tex.

[73] Assignee: International Business Machines Corporation, Armonk, N.Y.

[21] Appl. No.: 918,406

[22] Filed: Oct. 14, 1986

[51] Int. Cl.$^4$ .............................................. B41J 3/12
[52] U.S. Cl. ...................................... 400/121; 400/306
[58] Field of Search ....................... 400/121, 303, 306; 340/731, 735

[56] References Cited

U.S. PATENT DOCUMENTS 4,371,274  2/1983  Jaeger ............................. 400/306 X Primary Examiner—Paul T. Sewell
Attorney, Agent, or Firm—J. H. Barksdale, Jr.; H. St. Julian

[57] ABSTRACT

A method of determining character width for proportional spacing printing based on information contained in a dot pattern table. For a selected character, the character dot pattern in the table is analyzed to determine leading blanks and the actual character width. To obtain an overall width for printing, a number of trailing blanks equal to the number of leading blanks is added to the number of leading blanks and the actual character width. As such, a character suitable for proportional spacing printing is in effect built.

5 Claims, 2 Drawing Sheets

PROPORTIONAL SPACING PRINTING MANAGEMENT

TECHNICAL FIELD

This invention relates generally to proportional spacing printing, and more specifically to interpreting dot patterns of characters for effecting printing in a proportional spacing format.

BACKGROUND ART

Two types of tables are commonly used in the prior art. One has stored therein character dot patterns used for controlling the placement of dots on a sheet of paper being printed. Another stores information defining the escapement, or character width, of each character to be printed in a proportional spacing format. To print characters in a proportional spacing format generally requires at least one table of each type. These tables are also generally stored in working memory of a system for controlling the dot placement on the paper being printed. The system could be a printer system or a keyboard/display standalone, or host connected, computer workstation or system which controls a printer.

The advance of the present invention is elimination of a table defining escapement. This table takes up space in working memory that (1) could be used for other purposes, and (2) can impact performance. This table can be eliminated if the character's defined dot pattern in a dot pattern table is analyzed to determine escapement. The advantages of the above advance are additional memory for other jobs, tasks, etc., and elimination of the task of building new tables for new fonts.

DISCLOSURE OF THE INVENTION

A unique method of determining character width for proportional spacing printing is provided in order to reduce memory requirements. During preparation for causing the dot pattern for a character to be printed on a page, the dot pattern is further analyzed to determine a width for printer escapement. The width determined includes preceding blank space, the actual character width, and an amount of blank space following the defined dot pattern equal to the amount of preceding blank space.

BEST MODE FOR CARRYING OUT THE INVENTION

General Description and Definitions

Figure 1:
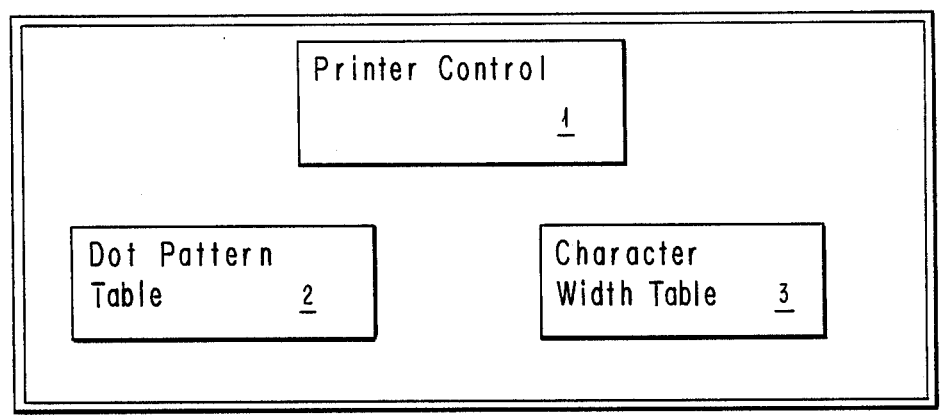
FIG. 1 is a block diagram illustration of a prior art program stored in working memory for effecting proportional spacing printing.

Refer first to FIG. 1. In FIG. 1 is illustrated prior art structure to control a matrix printer in grouping individual dots on a page being printed in such a way as to represent the likeness of the character. This structure may reside in the printer itself, or it may be resident in a program that resides in, or is loadable into, a computer system. Again, this structure controls the printed output in terms of placement of each individual dot on the page. Included in this structure is a program hereinafter referred to as printer control 1.

Associated with printer control 1 is a dot pattern table 2 which defines, or has stored therein, the arrangement of dots for each character. When printer control 1 is instructed by an application program to print a character, printer control 1 locates the arrangement of dots in the dot pattern table 2 for the character. Printer control 1 then causes a printing of the arrangement of dots on the page. In a standard spacing environment, there is a set number of columns of dots for each character. In a proportional spacing environment, printer control 2 must obtain a number from the character's entry in the character width table 3. This number will represent the number of columns to be printed. Included in the number will be preceding and following blank columns. For example, the actual width on an upper case character "A" may be five columns, and the actual width of an upper case "I" may be 3 columns. The overall width will include the actual character width plus blank space on either side of the character.

By using the routine of this invention, the character width table 3 can be eliminated, and future chores of building new character width tables for new fonts are eliminated. The routine causes each character to be analyzed in the dot pattern table 2 for determining the number of columns of the character's dot pattern that will be printed based on the actual width of the character, and the character, and the number of preceding blank columns. For actual printing, the overall width will include an amount equal to twice the preceding blank space in the dot pattern's allocated space plus the actual width of the character's dot pattern.

Figure 2:
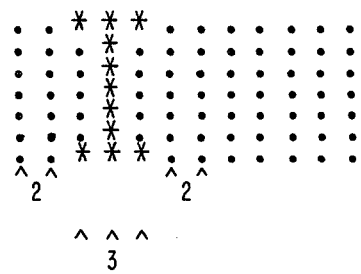
FIG. 2 illustrates a dot pattern for a character stored in a dot pattern table.

Refer next to FIG. 2. which is an illustration of a representative arrangement of dots in dot pattern table 2 for an upper case "I". Note that the allocated space in the table for this character is twelve vertical columns wide. Note also that there are two preceding vertical columns that contain no dots. Note further that the width of the actual dot pattern for the character is 3 vertical columns. This invention provides a routine or algorithm which in effect balances or centers the character by discarding or disregarding trailing blank columns in excess of preceding or leading blank columns. Therefore, the escapement used to print this character is seven vertical columns.

DETAILED DESCRIPTION

Set out below is an illustration of a routine that may be used by, or incorporated into printer control 1. This routine is in programming design language from which both source code and machine code are derivable.

```
GET PATTERN FOR CHARACTER TO BE PRINTED
DETERMINE THE NUMBER OF LEADING BLANK COLUMNS IN
        CHARACTER PATTERN
DETERMINE THE NUMBER OF COLUMNS IN THE ACTUAL PATTERN
ESCAPEMENT = # LEADING BLANK COLUMNS +  190 OF COLUMNS
        FOR THE PATTERN + # LEADING BLANK COLUMNS
```

```
-continued
IF ESCAPEMENT <2 THEN
    ESCAPEMENT = 2
ENDIF
IF ESCAPEMENT >12 THEN
    ESCAPEMENT = 12
ENDIF
PRINT THE LEFT-MOST NUMBER OF COLUMNS OF THE CHARACTER
            PATTERN SPECIFIED BY ESCAPEMENT
```

Figure 3:
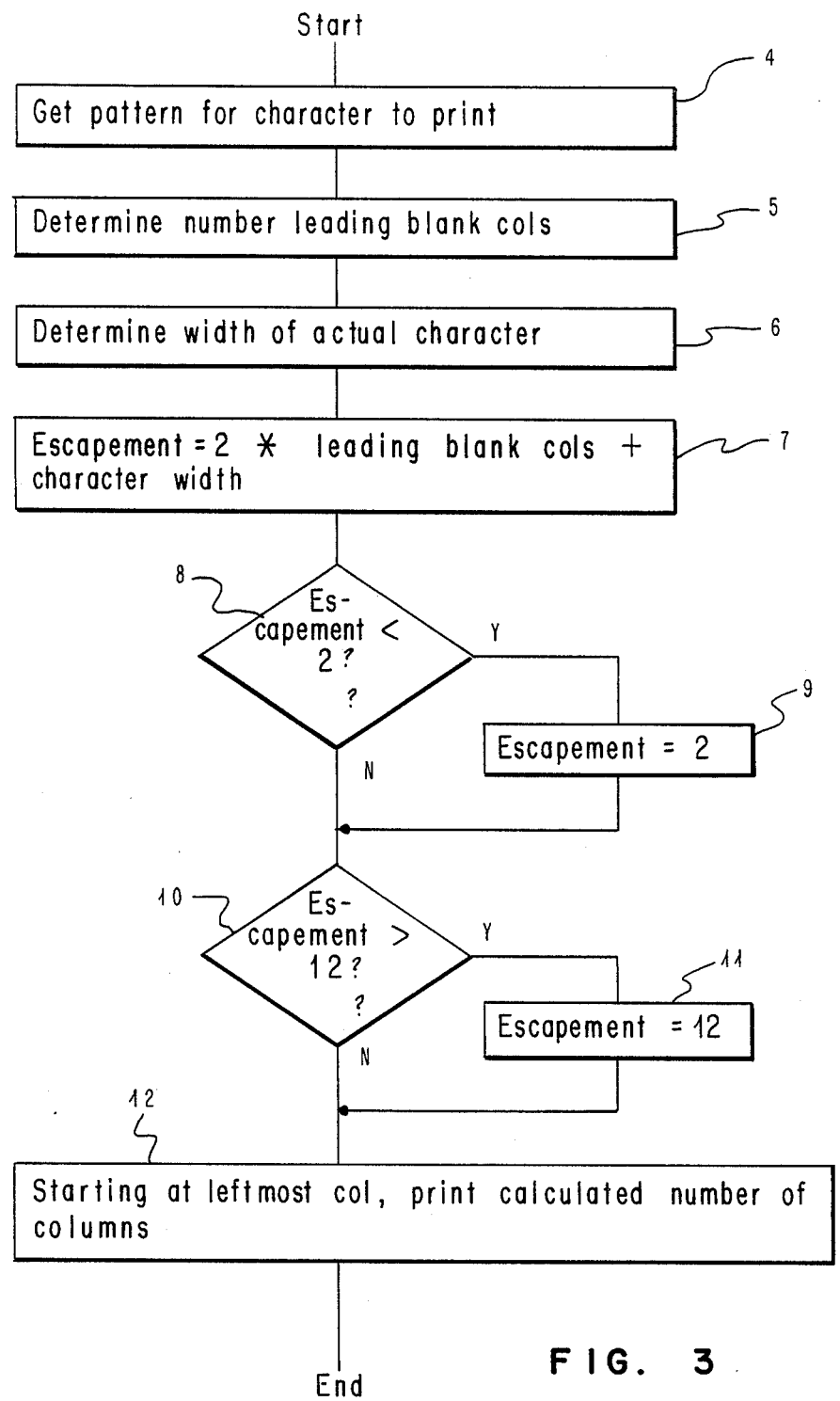
FIG. 3 is a flow chart illustrating operations performed in determining proportional width escapement from a character dot pattern table.

Refer next to the flow chart of FIG. 3 in conjunction with the programming design language. Defined are the operations performed to determine a width for a character to be printed.

First, the pattern for a selected character to be printed is located as indicated by block 4. In block 5, a determination is made as to the number of leading blank columns in the character's dot pattern. Next, as indicated by block 6, a determination is made as to the number of columns that contain dots for the actual character in the pattern.

With the above information in hand, a total escapement calculation is made by adding the number of leading blank columns to the number of columns containing dots, and then again adding the number of leading blank columns to balance the character. This is indicated by block 7. As such, a character is in effect built for proportional spacing printing.

Next, in order to ensure aesthetically pleasing print, a calculation is made to determine if the escapement for the character is within established range boundaries. If the calculated escapement is less than 2, as indicated by block 8, then escapement is forced to a minimum value of 2 as indicated by block 9. If the calculated escapement is greater than 12 as indicated by block 10, then escapement is forced to 12.

Finally, the calculated escapement is used to print the dot pattern including leading and trailing blanks.

In summary, a unique method of determining character width for proportional spacing printing is provided in order to reduce memory requirements. During preparation for causing the dot pattern for a character to be printed on the page, the dot pattern is further analyzed to determine its width for printer escapement. The width determined includes preceding blank space, the actual character width, and an amount of blank space following the defined dot pattern equal to the amount of preceding blank space.

While the invention has been particularly shown and described with reference to a preferred embodiment, it will be understood by those skilled in the art that various changes in form and detail may be made without departing from the spirit and scope of the invention.

I claim:

1. In a matrix printing system which utilizes a character dot pattern table, a method of determining a character width for proportional spacing printing, said method comprising the steps of:
   (a) determining a number of leading blank columns in a dot pattern associated with a selected one of a plurality of characters stored in said character dot pattern table to be printed;
   (b) determining the number of columns containing dots in said dot pattern; and
   (c) generating the overall character width by adding the number of leading blank columns, said number of columns containing dots, and a number of trailing blank columns equal to said number of leading blank columns.

2. A method according to claim 1 including establishing a minimum overall character width.

3. A method according to claim 1 including establishing a maximum overall character width.

4. A method according to claim 2 including adding blanks to said overall character width when said overall width is less than said minimum.

5. A method according to claim 3 including subtracting blanks when said overall width when said character width exceeds said maximum.

* * * * *